United States Patent
Christmas et al.

(12) 
(10) Patent No.: US 6,244,032 B1
(45) Date of Patent: Jun. 12, 2001

(54) CHAIN

(75) Inventors: Michael Charles Christmas, Cheadle Hulme; Michael David Barlow, Stockport, both of (GB)

(73) Assignee: Renold PLC, Manchester (GB)

( * ) Notice: Subject to any disclaimer, the term of this patent is extended or adjusted under 35 U.S.C. 154(b) by 0 days.

(21) Appl. No.: 09/672,133

(22) Filed: Sep. 27, 2000

(30) Foreign Application Priority Data

Sep. 28, 1999 (GB) .................................................. 9922781

(51) Int. Cl.⁷ .................................................. F16G 13/06
(52) U.S. Cl. .................................... 59/85; 59/5; 474/220
(58) Field of Search .................................... 474/206, 223, 474/224, 220; 59/5, 6, 7, 85

(56) References Cited

U.S. PATENT DOCUMENTS

| | | | | |
|---|---|---|---|---|
| 4,043,215 | * | 8/1977 | Long et al. ............................. | 59/85 |
| 5,186,569 | * | 2/1993 | Wu ......................................... | 59/85 |
| 5,291,730 | * | 3/1994 | Wu ......................................... | 59/85 |
| 5,299,416 | * | 4/1994 | Wu ......................................... | 59/85 |
| 5,305,594 | * | 4/1994 | Wang ..................................... | 59/85 |
| 5,362,282 | * | 11/1994 | Lickton ................................. | 59/85 |
| 5,400,585 | * | 3/1995 | Wang ..................................... | 59/85 |

FOREIGN PATENT DOCUMENTS

WO 98/26199   6/1998  (WO) .

* cited by examiner

*Primary Examiner*—David Jones
(74) *Attorney, Agent, or Firm*—Akin, Gump, Strauss, Hauer & Feld, L.L.P.

(57) ABSTRACT

A chain comprises inner and outer links that articulate relative to one another on pins. The outer link having apertures which receive said pin ends in such a way that the links are easily assembled or dismantled. The pin ends have a retention portion that defines a flat and a bearing portion disposed between the retention portion and the inner link and defining a bearing surface for the outer link. The aperture in the outer link has an arcuate edge and a flat corresponding to that on the retention portion. The bearing surface has an arcuate portion that provides a rotational sliding fit with the arcuate edge of the outer link aperture and a reduced portion that is undercut with respect to the retention portion. The inner and outer links are rotatable relative to one another between a first position in which the flats are aligned and outer link is separable from or connectable to the inner link by relative lateral movement and a second position in which inner and outer links are approximately longitudinally aligned and the flat edge of the outer link aperture is disposed over the undercut of the bearing surface. In this second position the retention portion adjacent the undercut serves to prevent lateral separation of the inner and outer links.

6 Claims, 5 Drawing Sheets

CHAIN

CROSS REFERENCE TO RELATED APPLICATIONS

This Application claims priority under 35 U.S.C. § 119 to British Patent Application No. 9922781.1 filed Sep. 28, 1999.

BACKGROUND OF THE INVENTION

A. Field of the Invention

The present invention relates to a chain of the kind used for transmission and/or transportation.

B. Description of the Related Art

A conventional roller and bush chain used for transmission or transportation purposes has pairs of opposed inner link plates that are interconnected with opposed pairs of outer link plates by pins about which the inner link plates articulate. Each pin is fixed at each end to an outer link plate but is pivotal relative to the inner link plates within a bush that extends between opposed apertures in the inner link plates.

Our co-pending PCT patent application WO 98/26199 describes a chain in which the outer link plates are mounted pivotally on the pin and a bearing is defined between the pin and the outer link plate. In one particular embodiment of WO98/26199 (FIGS. 14 to 16) the ends of each pin carry a bush on which the outer link plate articulates. The bush has a radially projecting lobe and the aperture of outer link plate has a corresponding recessed portion. In order to assemble the chain, the recess and the lobe are aligned and the outer link plate is moved axially with respect to the pin so that the recess passes over the lobe. When the outer link plate has passed clear of the lobe it is rotated through 90 degrees into longitudinal alignment with the other link plates. The lobe serves to prevent transverse separation of the inner and outer link plates in use. This arrangement provides for rapid assembly and dismantling of the chain but may be unsuitable for certain applications since the recesses in the outer link plates may have the effect of reducing the overall strength of the chain.

SUMMARY OF THE INVENTION

According to the present invention there is provided a chain comprising a plurality of chain links interconnected by pins so as to permit articulation of the links relative to one another, the links comprising inner links and outer links, the pins having ends that project laterally from the inner links, the outer links having apertures which receive said pin ends, at least one of said pin ends having a retention portion that defines at least one orientation element and a bearing portion disposed between the retention portion and the inner link and defining a bearing surface for the outer link, at least one of said outer link apertures being defined partially by at least one orientation surface corresponding to said orientation element on the retention portion, the bearing surface having a first portion that provides a rotational sliding fit with the outer link and a second portion that is undercut with respect to the first portion, the inner and outer links being rotatable relative to one another between a first position in which the orientation surface and element are aligned and outer link is separable from or connectable to the inner link by relative lateral movement and a second position in which inner and outer links are approximately longitudinally aligned and the orientation surface is disposed over the undercut of the bearing surface, the retention portion adjacent the undercut serving to prevent lateral separation of the inner and outer links.

The present invention allows quick assembly or disassembly of the outer link on to the inner link. In order to assemble the links the outer link is simply presented to the pin end with the orientation surface and elements aligned so that the retention portion is received in the outer link aperture, the inner and outer links are moved laterally towards one another until the aperture is disposed over the bearing portion of the pin end and then the links are rotated relative to one another to said second position. In order to dismantle the chain the procedure is reversed. The orientation element features permit assembly or disassembly in only a limited number of ways. The provision of the undercut allows the aperture to be reduced in size by the orientation surface rather than increased thereby not compromising the strength of the outer link.

Preferably the aperture of the outer link is circular with the orientation surface partially closing the circle. The orientation surface may be a flat but may have other configurations.

The retention member may comprise an arcuate edge corresponding to the circulate aperture of the outer link and sized so as to permit the outer link to pass over the retention member during assembly or disassembly.

The pin end may be defined integrally on the end of the pin or may be provided by a separable bush mounted on the pin.

BRIEF DESCRIPTION OF THE DRAWINGS

Specific embodiments of the present invention will now be described, by way of example only, with reference to the accompanying drawings in which.

DETAILED DESCRIPTION OF INVENTION

Figure 2:
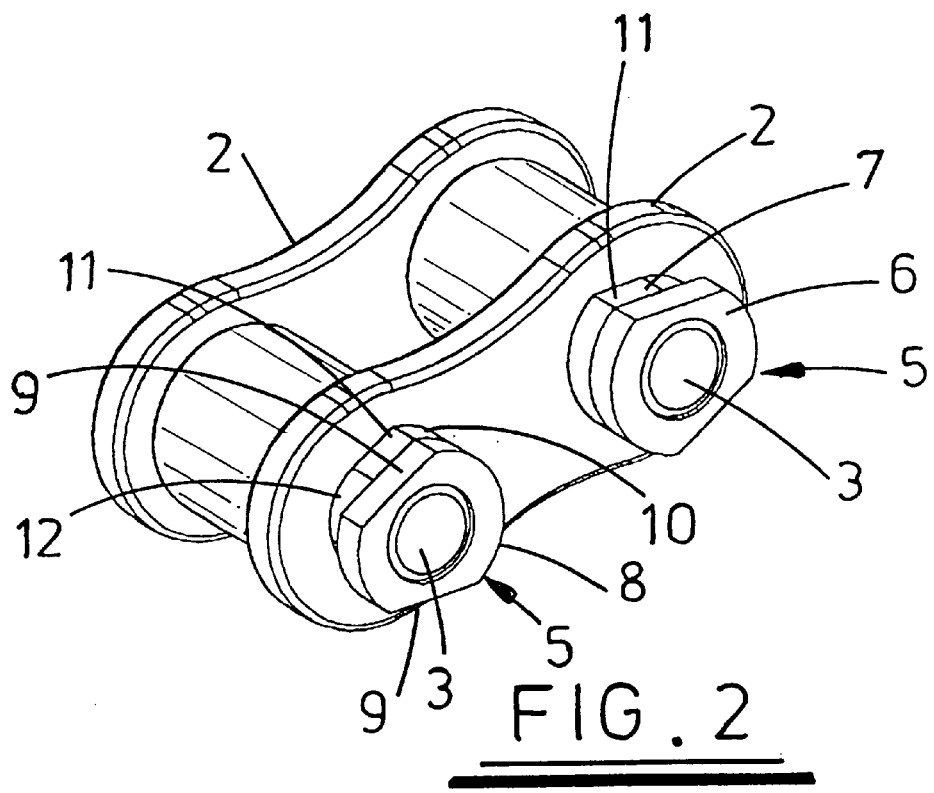
FIG. 2 is a perspective view of the assembly of FIG. 1 with the addition of a connection bush.
Figure 1:
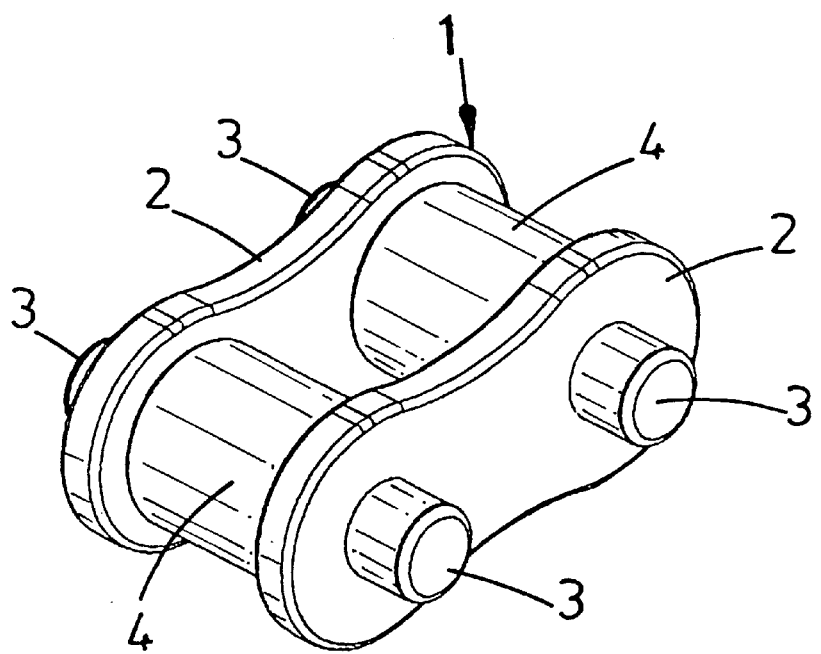
FIG. 1 is a perspective view of an inner link assembly of the chain of the present invention.

Referring now to the drawings, FIGS. 1 to 5 illustrate a first exemplary embodiment of a chain of the present invention. An inner link assembly 1 (FIG. 1) comprises opposed inner link plates 2 mounted on two spaced pins 3 with a friction (interference) fit. Cylindrical rollers 4 are rotatably mounted on the pins 3 between the inner link plates 2.

The end of each pin 3 carries a connection bush 5 that is mounted thereon with a friction (interference) fit. The bush 5 has a head portion 6 disposed so as to be outermost on the pin 3 and a bearing portion 7 disposed between the head portion 6 and the inner link plate 2. The head portion 6 has a peripheral surface 8 of generally circular configuration and constant diameter but with two flats 9. The bearing portion has a first arcuate surface 10 that is coterminous with an inwardly facing portion of the circular surface of the head portion 6, two reduced length flats 11 (one hidden) aligned with those of the head portion 6 and a second arcuate surface 12 of reduced diameter as compared to the first arcuate surface and the corresponding surface of the head portion 6 which therefore projects beyond the bearing portion 7 in that region.

Figure 4:
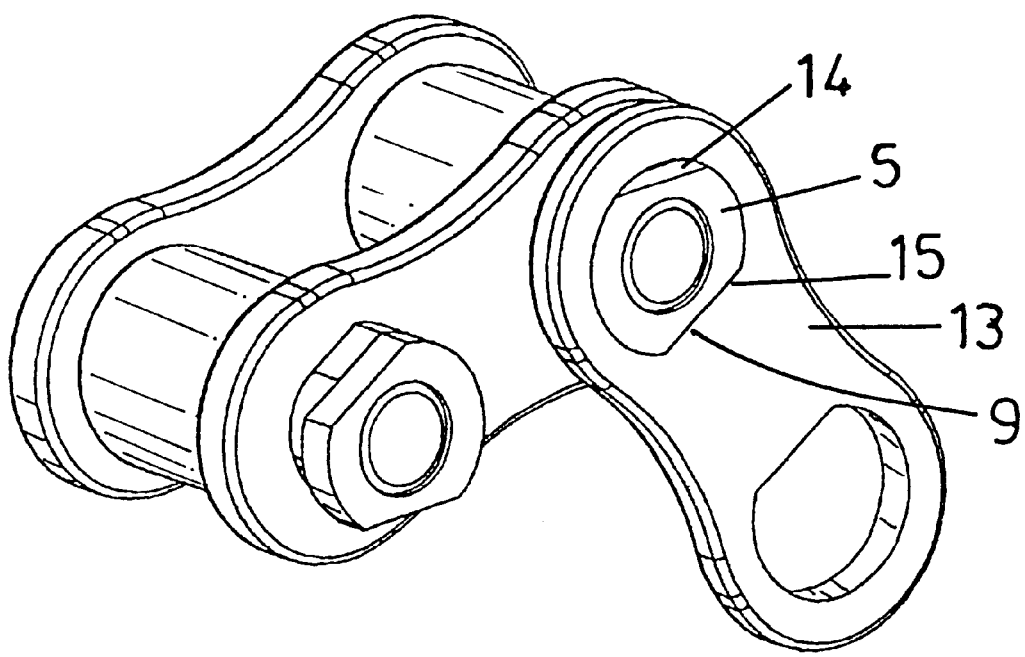
FIG. 4 illustrates, in perspective, the connection of the outer link plate of FIG. 3 with the inner link assembly and connection bush of FIG. 2.
Figure 3:
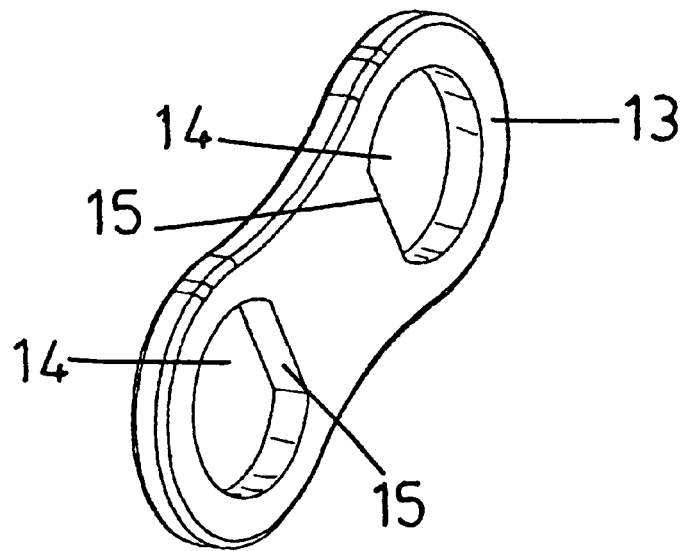
FIG. 3 is a perspective view of an outer link plate of the chain of the present invention.
Figure 5:
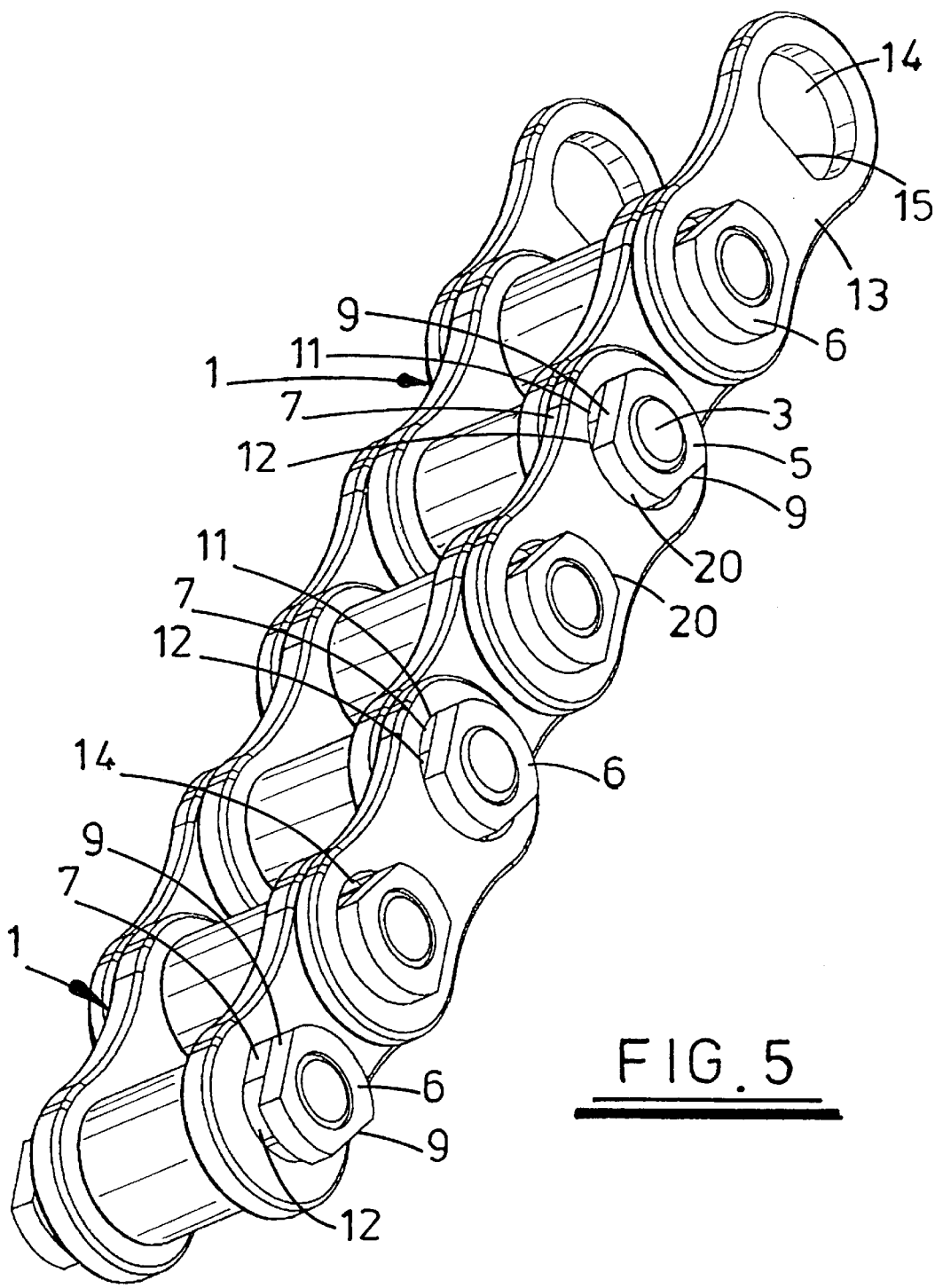
FIG. 5 shows a perspective view of an assembled chain using the components shown in FIGS. 1 to 4, in accordance with the present invention.

Each outer link plate 13 (see FIG. 3) has two apertures 14 that are generally circular but with a single flat 15. The circular portion and the flat 15 of each aperture 14 correspond in dimension to those of the head portion 6 of the connection bush 5 so that the outer link plate 13 may slide over the connection bush 5 as shown in FIG. 4. The provision of two flats 9 on the connection bush 5 allows each outer link plate 13 to be presented to the inner link assembly 1 in one of two orientations (one only shown in FIG. 4). It will be understood that any convenient number of flats may be provided on the connection bush.

In order to complete assembly the outer link plate 13 is slid over the head portion 6 of the connection bush 5 until it is supported on the bearing portion 7. The plate 13 is then rotated until it is longitudinally aligned with the inner link plates 2. In this position (seen in FIG. 5) the flat 15 defined on the aperture 14 of the outer link plate 13 bears against the reduced diameter arcuate surface 12 of the bearing portion 7 such that the adjacent part 20 of the head portion 6 projects thereover so as to prevent the outer link plate 13 sliding laterally off the connection bush 5. In order to disassemble the chain, the outer link plate 13 is rotated back to the position in which the flats 9, 15 are aligned so as to permit lateral separation of the outer link plate 13 and the inner link assembly 1.

In use, the outer link plates 13 articulate relative to the inner link assembly 1 about the bearing portions 1 of each connection bush 5. During articulation the flat 15 defining part of the aperture 14 in each outer link plate 13 bears against the reduced diameter second arcuate surface 12 of the bearing portion 1 of the connection bush 5 whereas the remaining circular edge of the aperture 14 bears against the larger first arcuate surface 10 of the bearing portion 1. The degree of articulation is limited by the extent of the second arcuate surface 12 since when the outer link plate flat 14 engages the corresponding flat on the bearing portion 7 further rotational movement in that direction is prevented. However, in most applications such a degree of articulation is sufficient.

The chain permits rapid assembly and disassembly by simple rotation followed by lateral movement of the outer link plates, thereby obviating the need for separate fastenings or removal tools. Moreover, the strength of the outer link plate is not compromised by grooves or recesses in the region around the apertures.

Figure 7:
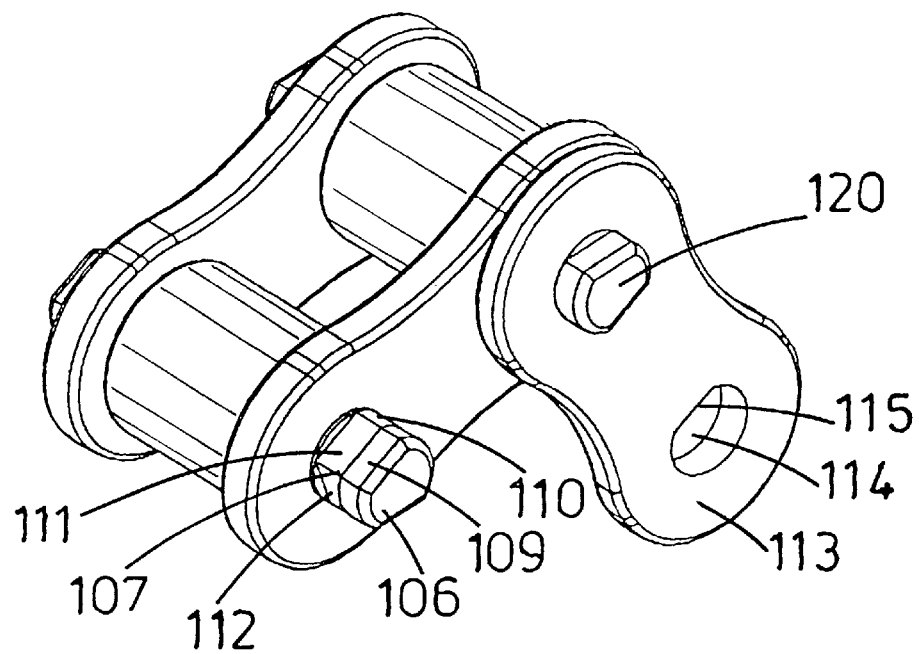
FIG. 7 is a perspective view of the assembly of FIG. 6 shown with an outer link plate.
Figure 6:
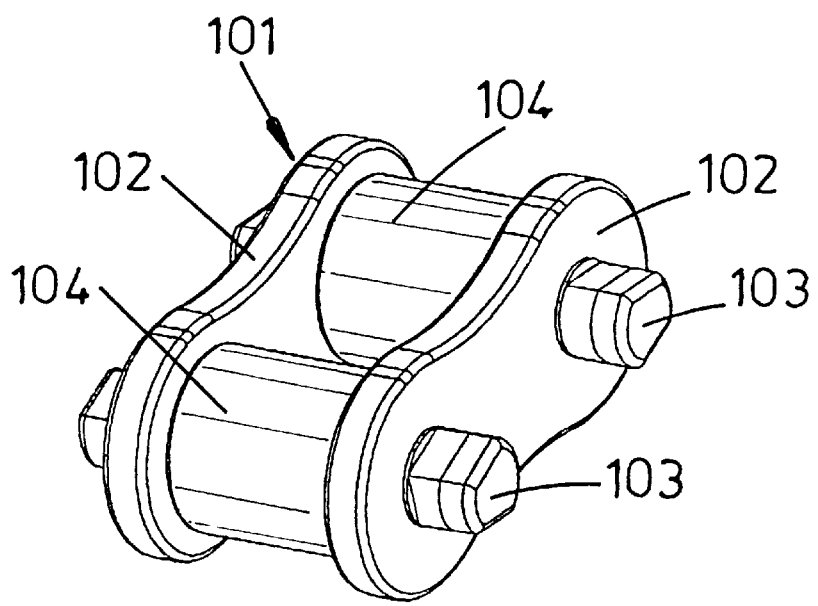
FIG. 6 is a perspective view of an alternative embodiment of an inner link plate assembly of the present invention.
Figure 8:
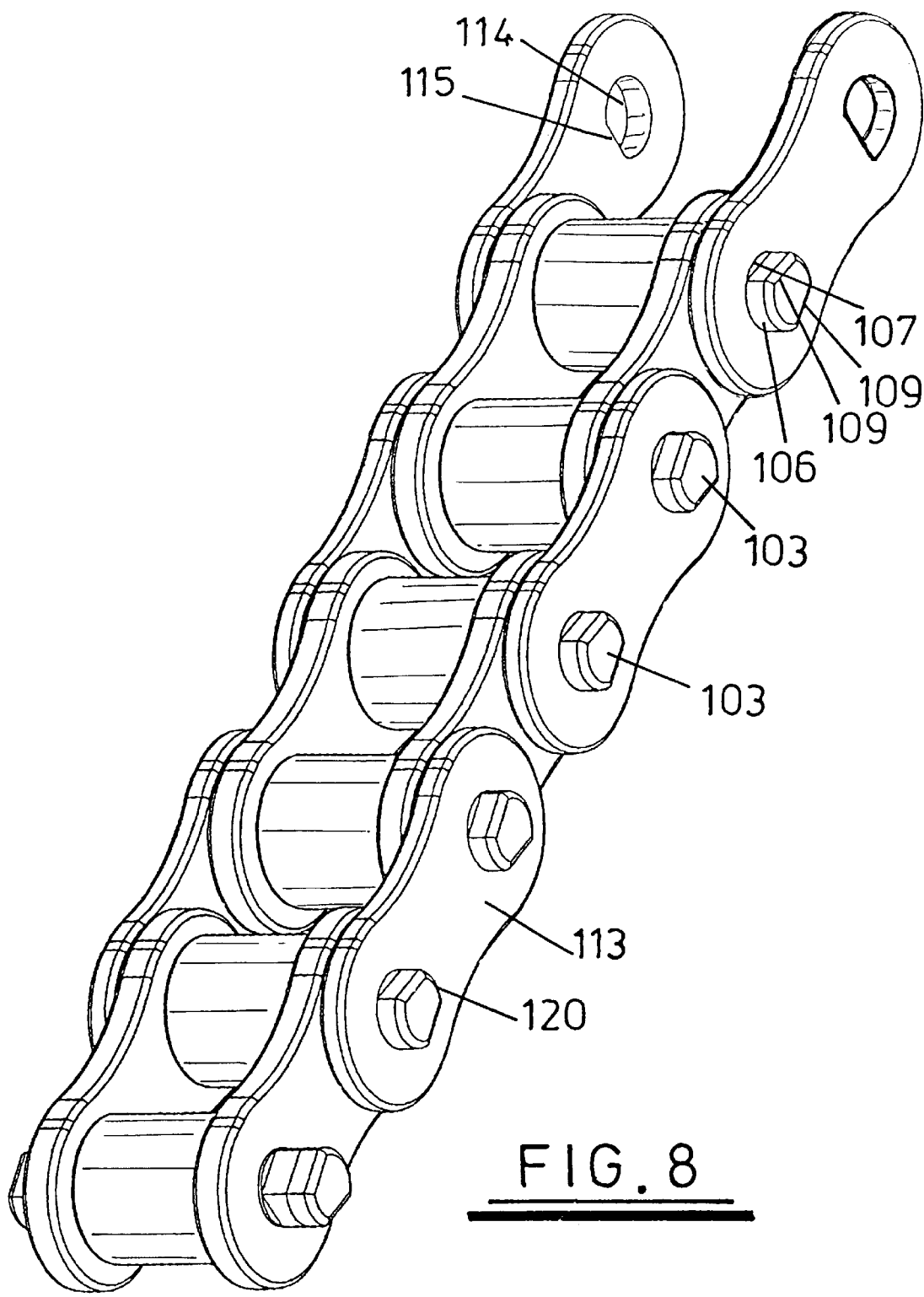
FIG. 8 is a perspective view of part of an assembled chain having the components shown in FIGS. 6 and 7, in accordance with the present invention.

A second embodiment of the chain of the present invention is shown in FIGS. 6 to 8. Features and parts corresponding to those of the design shown in FIGS. 1 to 5 are indicated by the same reference numerals but increased by 100 and are not further described except insofar as they differ from their counterparts of FIGS. 1 to 5. This embodiment differs from that described above in that the connection bush is replaced by a formation 105 machined on each end of the pin 103. The size of the formation is therefore smaller than that of the connection bush 5 but is of the same shape except that the reduced diameter arcuate surface is replaced by a flat surface 112.

It will be appreciated that numerous modifications to the above-described design may be made without departing from the scope of the invention as defined in the appended claims. For example, the flats 9, 14 may be substituted for other configurations provided they are complementary to enable relative orientation during assembly or disassembly. Moreover, the outer link plate may incorporate platform or other support such surfaces to enable the chain to be used in conveying applications.

What is claimed is:

1. A chain comprising a plurality of chain links interconnected by pins so as to permit articulation of the links relative to one another, the links comprising inner links and outer links, the pins having ends that project laterally from the inner links, the outer links having apertures which receive said pin ends, at least one of said pin ends having a retention portion that defines at least one orientation element and a bearing portion disposed between the retention portion and the inner link and defining a bearing surface for the outer link, at least one of said outer link apertures being defined partially by at least one orientation surface corresponding to said orientation element on the retention portion, the bearing surface having a first portion that provides a rotational sliding fit with the outer link and a second portion that is undercut with respect to the first portion, the inner and outer links being rotatable relative to one another between a first position in which the orientation surface and element are aligned and outer link is separable from or connectable to the inner link by relative lateral movement and a second position in which inner and outer links are approximately longitudinally aligned and the orientation surface is disposed over the undercut of the bearing surface, the retention portion adjacent the undercut serving to prevent lateral separation of the inner and outer links.

2. A chain according to claim 1, wherein the aperture of the outer link is circular with the orientation surface partially closing the circle.

3. A chain according to claim 1, wherein the orientation surface is defined by a flat.

4. A chain according to claim 2, wherein the retention member has an arcuate edge corresponding to the circular aperture of the outer link and sized so as to permit the outer link to pass over the retention member during assembly or disassembly.

5. A chain according to claim 1, wherein the pin end is defined integrally on the pin.

6. A chain according to anyone of claim 1, wherein the pin end is defined by a separable bush mounted on the pin.

* * * * *